Figure 1:
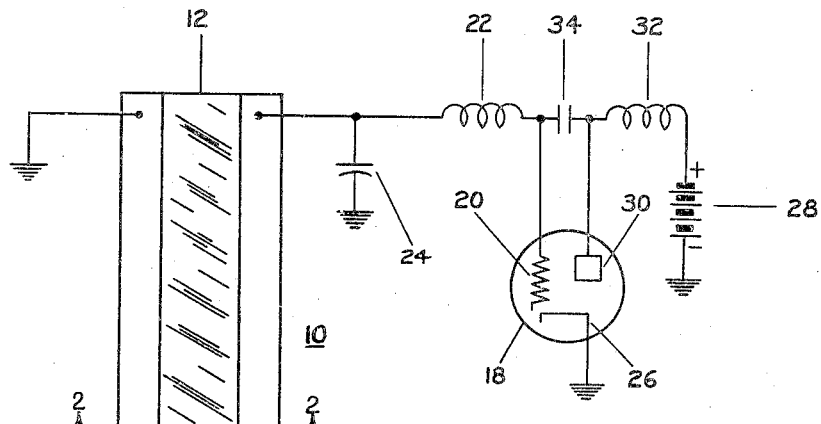

Sept. 13, 1949.                A. B. DEMBER                2,481,728
                        HUMIDITY RESPONSIVE RESISTOR
                           Filed Oct. 24, 1945

INVENTOR
ALEXIS B. DEMBER
BY George V Ettgrott
   AGENT

Patented Sept. 13, 1949

2,481,728

UNITED STATES PATENT OFFICE 2,481,728

HUMIDITY RESPONSIVE RESISTOR

Alexis B. Dember, Towson, Md., assignor to Bendix Aviation Corporation, South Bend, Ind., a corporation of Delaware Application October 24, 1945, Serial No. 624,245

5 Claims. (Cl. 201—63)

This invention relates to hygroscopically responsive resistors and more particularly to a hygroscopic responsive resistive structure in which polarization effects are reduced to a minimum.

Hygroscopic responsive structures in which the resistance thereof varies with the ambient relative humidity are well known in the art, having been discussed by Fiene, Dunmore and others. Such resistors afford a means of quickly and accurately determining the relative humidity and are quite reliable in their indications when employed in circuits supplied with alternating current energy. Unfortunately, the conditions under which meteorological observations are taken often do not afford opportunity for the use of alternating current energy in the measuring circuits so that recourse must be had to circuits employing direct current energy. When such resistors are used in direct current circuits, it has been found that the flow of current therethrough with a given impressed potential is not solely a function of the ambient relative humidity but in addition varies with the time during which the measuring element has been subjected to the passage of direct current.

This is generally believed to arise from the fact that the conduction phenomena occurring in the passage of an electric current through a layer of hygroscopic material are essentially electrolytic in nature and are accompanied by changes at the electrode interface where the current enters the hygroscopic medium developing a varying counter-E. M. F. as well as diminshing the effective interface area. The effect is cumulative and hence, while a number of hygroscopic responsive resistors may possess indentical characteristics at the moment of impression of an electric voltage thereon, yet, due to variations in their polarization characteristics, as time passes the divergent characteristics become increasingly obvious. Polarization effects are very difficult to render uniform, require correction by a factor controlled by the time of application of current to the resistor and vary quite widely with temperature. Thus, it is obvious that in humidity measuring circuits energized by direct current, it is of great advantage to employ a humidity responsive resistor substantially free from such polarization errors.

It is hence an object of the invention to provide a new and novel humidity responsive resistor with reduced polarization introduced error.

It is a further object of the invention to provide a new and novel process for the manufacture of humidity responsive resistors in which the number of steps is reduced from previous practice and the product of said process is possessed of improved polarization characteristics.

Figure 2:
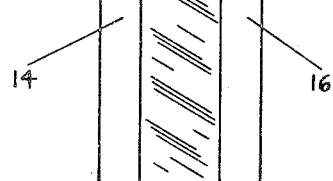
Figure 3:
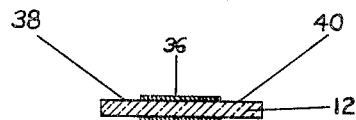
Figure 5:
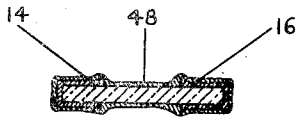
Figure 6:
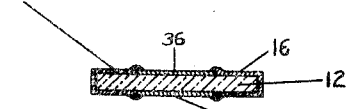
Figure 4:

Other objects and advantages of the invention will, in part be disclosed, and in part be obvious when the following specification is read in conjunction with the drawings in which:

Figure 1 presents a side view of the humidity responsive element and illustrates a typical circuit in which it may be utilized, Figure 2 is a section of the base strip through the line 2—2 of Figure 1 at the completion of one of the early process operations, Figure 3 is a sectional view of the base strip after a succeeding step of the processing operation, Figure 4 is a sectional view illustrating still another processing step, Figure 5 is an end view of the resistor structure upon the completion of its processing, and Figure 6 illustrates, for comparison purposes, the structure of a conventional strip.

Referring now to Figure 1, there is shown at 10 a humidity responsive resistor assembly resembling, in general outline, conventional structures. The strip includes a base member 12 of which only the central portion is visible. Along the edges of the long rectangular base strip 12 there are situated the conductive metallic coatings 14 and 16. As is known in the art, the area of the strip 12 included between electrodes 14 and 16 may be coated with some hygroscopic or deliquescent salt, such as lithium chloride, whose conductivity varies as a function of the humidity of the atmosphere surrounding the strip.

Such strips are frequently employed in conjunction with relaxation oscillator circuits of the general variety shown in which an electric discharge tube 18 is employed having its control grid 20 connected to one terminal of a grid coil 22, whose other terminal is connected to the electrode 16 and to ground through capacitor 24. Electrode 14 is connected to ground, as are the cathode 26 of the tube 18 and the negative terminal of the anode supply source 28. The anode 30 of tube 18 is connected with positive terminal from anode source 28 through the anode coupling coil 32 and the grid 20 is connected with anode 30 by capacitor 34, serving both as a coupling impedance and a means of isolating the D. C. anode circuit from the grid circuit.

As is well known, circuits of this nature oscillate in an intermittent manner, the oscillations building up in magnitude until the grid 20 is driven into the conductive operating region, whereupon the flow of grid current charges capacitor 24 to impress on grid 20 a negative potential ultimately interrupting the oscillations. After the oscillations have died away the circuits remain in a non-oscillatory state until capacitor 24 has discharged sufficiently through the humidity responsive resistor 10 to permit the reestablishment of electron flow through the valve 18, after which oscillations are again initiated, continuing to build up until by the same process they are once more interrupted. The entire process is periodically repeated to provide a series of pulses whose repetition rate is controlled by the rate at which capacitor 24 discharges through the humidity responsive resistor 10. The repetition frequency is thus indicative of the ambient humidity in which resistor 10 is situated since the conductivity of said resistor 10 varies with changes in said ambient humidity.

The process by which resistor strip 10 is prepared may be most clearly understood from consideration of Figures 2, 3, 4 and 5 and the following text material. The sectional view in Figure 2 taken through the lines 2—2 of Figure 1 show the approximate cross-sectional dimensions of a suitable base strip 12 preferably of some substantially non-conductive material, such as polystyrene or other suitable plastic. In the first step of preparation, bands 36 are fixed along the entire length of strip substantially medially thereof, leaving free the edges 38 and 40 of the base strip 12. Tape provided with an adhesive backing may conveniently be employed for the bands 36.

After the affixing of the masking bands 36 to the base strip 12, a metallic film 14, 16 may be deposited on the assembly as shown. Either electric or mechanical deposition methods may be employed for the production of the film 14, 16.

The bands 36 are now removed leaving the central portion of the strip 12 free as in Figure 4. It is to be particularly noted that with the removal of the strips 36 there is produced an upwardly projecting burr-like edge along the inner portions of conductive deposits 14 and 16.

By previously accepted practice in the art these rough, irregular edges 44, 46 were dressed down until smooth with the edges as shown in Figure 6. To produce the improved resistor described herein however, the strip 12 is merely cleaned after the step corresponding to Figure 4 and then dipped in a solution of one of the many well-known hygroscopic salts such as lithium chloride, earlier referred to, to produce thereon the electrolytically conducting film 48 seen in Figure 5. This is in decided contrast to the cross-section of the conventional structure shown in Figure 6 where the opposing edges of the conductive electrode are dressed down flush with the base surface.

It has been determined experimentally that the polarization error in the improved structure of Figure 5 is but one-third that of the resistor structure shown in Figure 6, representing conventional practice. As an example, in testing a quantity of each of the resistor types, namely Figures 5 and 6, for a period of 30 minutes continuously with a duty cycle of 15 seconds on, 30 seconds off, it was found that the polarization error with the dressed edge resistors was 12.7% while that of the undressed irregular edge resistors was 4.15%.

The improvement may possibly be attributed to the diminished current density existing at the electrode-film interface in the undressed edge resistor structure. That such will be the case is evident from a consideration of the fact that the conducting electrode establishes a unipotential surface over which no voltage gradient can exist and consequently no current will flow. The greatest concentration of current flow, i. e., greatest current density, will occur at those points where the gradient maximizes and in the dressed edge structure this condition is true at the feather edge, presenting relatively restricted area to the hygroscopic film. This results in rapid polarization.

In the structure with the untreated edge however, there is no such restriction of the region in which a relatively high voltage gradient exists at the interface, with the result that the current flows to the electrode over a greater area, diminishing polarization effects.

It will be obvious that the increased electrode interface area may be secured by the use of properly formed foil or strip electrodes as well as by electrodes produced employing the process earlier outlined, or by etching.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In a hygroscopic resistor assembly subject to variations in resistance resulting from the effects of polarization, the combination of, a relatively non-conductive base, film electrodes of conductive material deposited on said base having edges curving upwardly away from said base, and a film of electrolytically conductive material extending over said base and in contact with at least a portion of said edges, the said upwardly curving edges serving to present a relatively large area of interface contact between the said film electrodes and the said film of electrolytically conductive material, whereby the effects of polarization are minimized.

2. In a hygroscopic resistor assembly subject to variations in resistance resulting from the effects of polarization, the combination of, a relatively non-conductive base, a film electrode of conductive material situate on said base having an edge extending away from said base, and a film of electrolytically conductive material extending over said base and in contact with at least the edge portion of said electrode, the said edge extending away from said base serving to present a relatively large area of interface contact between the said film electrodes and the said film of electrolytically conductive material, whereby the effects of polarization are minimized.

3. In a hygroscopic resistor assembly subject to variations in resistance resulting from the effects of polarization, the combination of, a relatively non-conductive base, an electrode of conductive material situate on said base having the edge thereof formed to increase the projected cross-sectional area of said electrode viewed in a direction parallel to said base at said edge whereby the effects of polarization are minimized, and a film of electrolytically conductive material extending over said base and in contact with at least the edge portion of said electrode.

4. In a hygroscopic resistor assembly subject to variations in resistance resulting from the effects of polarization, the combination of, a substantially non-conductive base, a metallic electrode deposited on said base having an edge extending away from said base, and a film of electrolytically conductive material extending over said base and in contact with at least the edge portion of said electrode, the said edge extending away from said base serving to present a relatively large area of interface contact between the said metallic electrode and the said film of electrolytically conductive material, whereby the effects of polarization are minimized.

5. In a hygroscopic resistor assembly subject to variations in resistance resulting from the effects of polarization, the combination of, a rectangular strip of substantially non-conductive material, metallic electrodes situate along two opposing edges of said strip and having opposing faces extending away from said strip while the remainder of said electrodes is substantially parallel to the face of said strip, and a film of electrolytically conductive material extending over strip and in contact with said faces, the said opposing faces extending away from said strip serving to present a relatively large area of interface contact between the said metallic electrodes and the said film of electrolytically conductive material, whereby the effects of polarization are minimized.

ALEXIS B. DEMBER.

REFERENCES CITED

The following references are of record in the file of this patent:

UNITED STATES PATENTS

| Number | Name | Date |
| --- | --- | --- |
| 2,005,456 | Creager | June 18, 1935 |
| 2,091,259 | Fisher | Aug. 31, 1937 |
| 2,175,893 | Hill | Oct. 10, 1939 |
| 2,256,642 | Gaut | Sept. 23, 1941 |
| 2,419,537 | Christensen | Apr. 29, 1947 |

Disclaimer 2,481,728.—*Alexis B. Dember*, Towson, Md. HUMIDITY RESPONSIVE RESISTOR. Patent dated Sept. 13, 1949. Disclaimer filed July 11, 1950, by the assignee, *Bendix Aviation Corporation*.

Hereby enters this disclaimer to all of the claims of said patent, namely claims 1 to 5, inclusive.

[*Official Gazette August 8, 1950.*]